United States Patent
Mizuta et al.

(10) Patent No.: US 12,554,800 B2
(45) Date of Patent: Feb. 17, 2026

(54) DATA CLASSIFICATION DEVICE, DATA CLASSIFICATION METHOD, AND DATA CLASSIFICATION PROGRAM

(71) Applicant: Toray Industries, Inc., Tokyo (JP)

(72) Inventors: Shingo Mizuta, Otsu (JP); Keita Ikeda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 726 days.

(21) Appl. No.: 17/913,256

(22) PCT Filed: Feb. 10, 2021

(86) PCT No.: PCT/JP2021/005080
§ 371 (c)(1),
(2) Date: Sep. 21, 2022

(87) PCT Pub. No.: WO2021/199706
PCT Pub. Date: Oct. 7, 2021

(65) Prior Publication Data
US 2023/0126191 A1    Apr. 27, 2023

(30) Foreign Application Priority Data
Mar. 31, 2020    (JP) .................. 2020-062979

(51) Int. Cl.
*G06F 18/2413*    (2023.01)
*G06F 18/21*    (2023.01)
(Continued)

(52) U.S. Cl.
CPC ........ *G06F 18/2413* (2023.01); *G06F 18/217* (2023.01); *G06F 18/22* (2023.01); *G06F 18/2431* (2023.01)

(58) Field of Classification Search
CPC .... G06F 18/2413; G06F 18/22; G06F 18/217; G06F 18/2431
See application file for complete search history.

(56) References Cited

U.S. PATENT DOCUMENTS 7,570,797 B1 * 8/2009 Wang ...................... G06F 18/40
356/237.4
9,165,051 B2 * 10/2015 Masud .................. G06F 16/285
(Continued)

FOREIGN PATENT DOCUMENTS

| CN | 110866891 A | 3/2020 |
| JP | 1074188 A | 3/1998 |

(Continued)

OTHER PUBLICATIONS

Nishimura Shin, et al., JP 2023077690 A, filed Nov. 25, 2021, English Translation (Year: 2021).*
(Continued)

*Primary Examiner* — Barbara M Level
(74) *Attorney, Agent, or Firm* — Buchanan Ingersoll & Rooney PC

(57) ABSTRACT

A data classification device includes: a data acquisition unit configured to acquire data to be classified; a classification unit configured to classify the data into one of a plurality of classes by using a learned model learned using a neural network; a similarity calculation unit that calculates the similarity between the data and learned data used to generate the learned model; and a determination unit configured to determine whether the data belongs to the classes on the basis of the similarity, and, when the data does not belong to any of the classes, determine that the data belongs to an unknown class.

4 Claims, 7 Drawing Sheets

202

| IMAGE NAME | EUCLIDEAN DISTANCE | IMAGE | DEFECT TYPE | |
|---|---|---|---|---|
| Sample3.png | 0 | ✓ | ? | NO SIMILAR IMAGE EXISTS. UNKNOWN CLASS |
| train2.png | 11 | ◀ | 1 | |
| train6.png | 15 | ∴ | 3 | |
| train16.png | 21 | 0 | 4 | |
| train10.png | 25 | \ | 2 | |

(51) Int. Cl.
G06F 18/22 (2023.01)
G06F 18/2431 (2023.01)

(56) References Cited

U.S. PATENT DOCUMENTS

| | | | | |
|---|---|---|---|---|
| 9,785,866 | B2* | 10/2017 | Hua | G06F 18/23 |
| 11,250,552 | B1* | 2/2022 | Padfield | G06F 18/2155 |
| 11,783,233 | B1* | 10/2023 | Kudli | G06N 20/00 |
| | | | | 706/12 |
| 2003/0118149 | A1* | 6/2003 | Okuda | G01N 23/225 |
| | | | | 378/58 |
| 2011/0311125 | A1* | 12/2011 | Konishi | H01L 22/20 |
| | | | | 382/149 |
| 2016/0078359 | A1* | 3/2016 | Csurka | G06V 10/776 |
| | | | | 706/12 |
| 2016/0092790 | A1* | 3/2016 | Ribeiro Mendes Júnior | |
| | | | | G06N 20/00 |
| | | | | 706/12 |
| 2016/0217349 | A1* | 7/2016 | Hua | G06N 20/00 |
| 2017/0039469 | A1* | 2/2017 | Majumdar | G06F 18/214 |
| 2018/0336439 | A1* | 11/2018 | Kliger | G06N 3/088 |
| 2019/0156155 | A1 | 5/2019 | Wang et al. | |
| 2020/0074238 | A1 | 3/2020 | Umeno et al. | |
| 2020/0320402 | A1* | 10/2020 | Yoon | G06N 3/045 |
| 2020/0394557 | A1* | 12/2020 | Boult | G06F 16/285 |
| 2021/0256300 | A1* | 8/2021 | Shankar | G06V 10/56 |

FOREIGN PATENT DOCUMENTS

| | | |
|---|---|---|
| JP | 2000207377 A | 7/2000 |
| JP | 2001142868 A | 5/2001 |
| JP | 2019096313 A | 6/2019 |
| JP | 2019-109662 A | 7/2019 |
| JP | 2020-030565 A | 2/2020 |
| WO | 2019/215924 A1 | 11/2019 |

OTHER PUBLICATIONS

International Search Report and Written Opinion for International Application No. PCT/JP2021/005080, dated Apr. 6, 2021, 7 pages.
Ranjan et al., "L2-constrained Softmax Loss for Discriminative Face Verification", preprint, Mar. 30, 2017, arXiv:1703.09507 [cs.CV] (https://arxiv.org/pdf/1703.09507.pdf), 11 pages.
Shima et al., "A Probabilistic Neural Network with Anomaly Detection and Related Application to an EMG-controlled Prosthetic Hand", Journal of the Robotics Society of Japan, Jun. 2015, with English abstract, 33(4):275-284.
Urakawa, K., "Unknown Network Anomaly Detection Focused on Quantity of Payload Features", Computer Security Symposium, Oct. 22-25, 2018, with partial English translation, 10 pages.
Wiewel et al., "Continual Learning for Anomaly Detection with Variational Autoencoder," ICASSP 2019-2019 IEEE International Conference on Acoustics, Speech and Signal Processing (ICASSP), IEEE, May 12, 2019, pp. 3837-3841.
Wu et al., "Incremental Classifier Learning with Generative Adversarial Networks," arXiv (Cornell University), Feb. 2, 2018, pp. 1-10.
The extended European Search Report issued Apr. 4, 2024, by the European Patent Office in corresponding European Patent Application No. 21779595.4-1203. (8 pages).
Zhang et al., "Open Set Face Recognition Approach Based on Similarity Distribution", Pattern Recognition and Artificial Intelligence, (Feb. 2011), vol. 24, No. 1, pp. 147-152. (with English abstract).
Office Action (The First Office Action) issued Dec. 15, 2025, by the State Intellectual Property Office of People's Republic of China in corresponding Chinese Patent Application No. 202180024451.7 and an English translation of the Office Action. (17 pages).

* cited by examiner

FIG.4

| IMAGE NAME | EUCLIDEAN DISTANCE | IMAGE | DEFECT TYPE | |
|---|---|---|---|---|
| Sample1.png | 0 | ▲ | 1 | CLASSIFIED AS "DEFECT TYPE 1" |
| train1.png | 1.5 | ● | 1 | |
| train2.png | 2.1 | ◀ | 1 | |
| train3.png | 3.6 | ♦ | 1 | |
| train4.png | 4.9 | ▼ | 1 | |

FIG.5

| IMAGE NAME | EUCLIDEAN DISTANCE | IMAGE | DEFECT TYPE | |
|---|---|---|---|---|
| Sample3.png | 0 | ◁ | ? | NO SIMILAR IMAGE EXISTS. UNKNOWN CLASS |
| train2.png | 11 | ◀ | 1 | |
| train6.png | 15 | ⋯ | 3 | |
| train16.png | 21 | 0 | 4 | |
| train10.png | 25 | \ | 2 | |

DATA CLASSIFICATION DEVICE, DATA CLASSIFICATION METHOD, AND DATA CLASSIFICATION PROGRAM

CROSS REFERENCE TO RELATED APPLICATIONS

This is the U.S. National Phase application of PCT/JP2021/005080, filed Feb. 10, 2021 which claims priority to Japanese Patent Application No. 2020-062979, filed Mar. 31, 2020, the disclosures of each of these applications being incorporated herein by reference in their entireties for all purposes.

FIELD OF THE INVENTION

The present invention relates to a data classification device, a data classification method, and a data classification program.

BACKGROUND OF THE INVENTION

There has been a known technique of causing a classifier composed by learning using a convolutional neural network to classify data (see, for example, Patent Literature 1).

PATENT LITERATURE

Patent Literature 1: Japanese Patent Application Laid-open No. 2019-96313

SUMMARY OF THE INVENTION

The classifier described above classifies data into one of known learned classes, even if the data is of an unknown class that originally cannot be classified. This could result in decreased accuracy in classification if an unknown class could occur in the data. Therefore, there has been a need for a technique that is capable of preventing the classification of data of an unknown class into a known class.

In view of the above, it is an object of the present invention to provide a data classification device, a data classification method, and a data classification program that are capable of preventing classification of data of an unknown class into a known class.

To solve the problem described above and to achieve the object, a data classification device according to embodiments of the present invention includes: a data acquisition unit configured to acquire data to be classified; a classification unit configured to classify the data into one of a plurality of classes by using a learned model learned using a neural network; a similarity calculation unit configured to calculate similarity between the data and learned data used to generate the learned model; and a determination unit configured to determine whether the data belongs to the classes, based on the similarity, and, when the data does not belong to any of the classes, determine that the data belongs to an unknown class.

A data classification device according to the preferred embodiment of the present invention is the data classification device according to the above-described invention in which the learned model takes the data as an input parameter and the learned model takes a classification result and a feature amount of the data as output parameters.

A data classification device according to the preferred embodiment of the present invention is the data classification device according to the above-described invention in which the similarity calculation unit is configured to calculate the similarity using a feature amount of the data and a feature amount of the learned data, and the determination unit is configured to determine, when the similarity meets a standard, a class to which the data belongs according to a classification result of the classification unit, and determine that, when the similarity does not meet the standard, the data is of an unknown class.

A data classification device according to the preferred embodiment of the present invention is the data classification device according to the above-described invention in which a control unit configured to cause a display device to display at least data most similar to the data together with a determination result by the determination unit is included.

A data classification device according to the preferred embodiment of the present invention is the data classification device according to the above-described invention in which an evaluation value calculation unit configured to calculate, when the number of determinations by the determination unit reaches the standard number of times, a determination evaluation value, which is a ratio of determinations that the data belongs to one of the classes, of determinations made the standard number of times, and a control unit configured to output, when the determination evaluation value is smaller than a threshold value, at least one of an evaluation result and information that prompts reconstruction of the learned model are included.

A data classification device according to the preferred embodiment of the present invention is the data classification device according to the above-described invention in which the similarity calculation unit is configured to calculate a minimum value in each class of Euclidean distance between a feature amount of the data and a feature amount of the learned data in a feature space as similarity to each class.

A data classification device according to the preferred embodiment of the present invention is the data classification device according to the above-described invention in which the similarity calculation unit is configured to calculate a predetermined distance between a feature amount of the data and the learned data representing each of the classes in a feature space as similarity to each class.

A data classification method according to the present invention includes: a step of acquiring data to be classified; a step of classifying the data into one of a plurality of classes by reading out a learned model learned using a neural network from a storage unit, and by using the learned model; a step of calculating similarity between the data and learned data used to generate the learned model; and a step of determining whether the data belongs to the classes, based on the similarity, and, when the data does not belong to any of the classes, determining that the data belongs to an unknown class.

Provided is a data classification program according to the present invention that causes a computer to execute. The data classification program includes: a step of acquiring data to be classified; a step of classifying the data into one of a plurality of classes by using a learned model learned using a neural network; a step of calculating similarity between the data and learned data used to generate the learned model; and a step of determining whether the data belongs to the classes, based on the similarity, and, when the data does not belong to any of the classes, determining that the data belongs to an unknown class.

According to the present invention, data of an unknown class can be prevented from being classified into a known class.

BRIEF DESCRIPTION OF DRAWINGS

FIG. 4 is a diagram illustrating a display example (1) of determination results.

FIG. 5 is a diagram illustrating a display example (2) of determination results.

DETAILED DESCRIPTION OF EMBODIMENTS OF THE INVENTION

Embodiments of the present invention (hereinafter referred to as the "embodiments") will be described below with reference to the accompanying drawings. The present invention is not limited by the embodiments described below.

Figure 1:
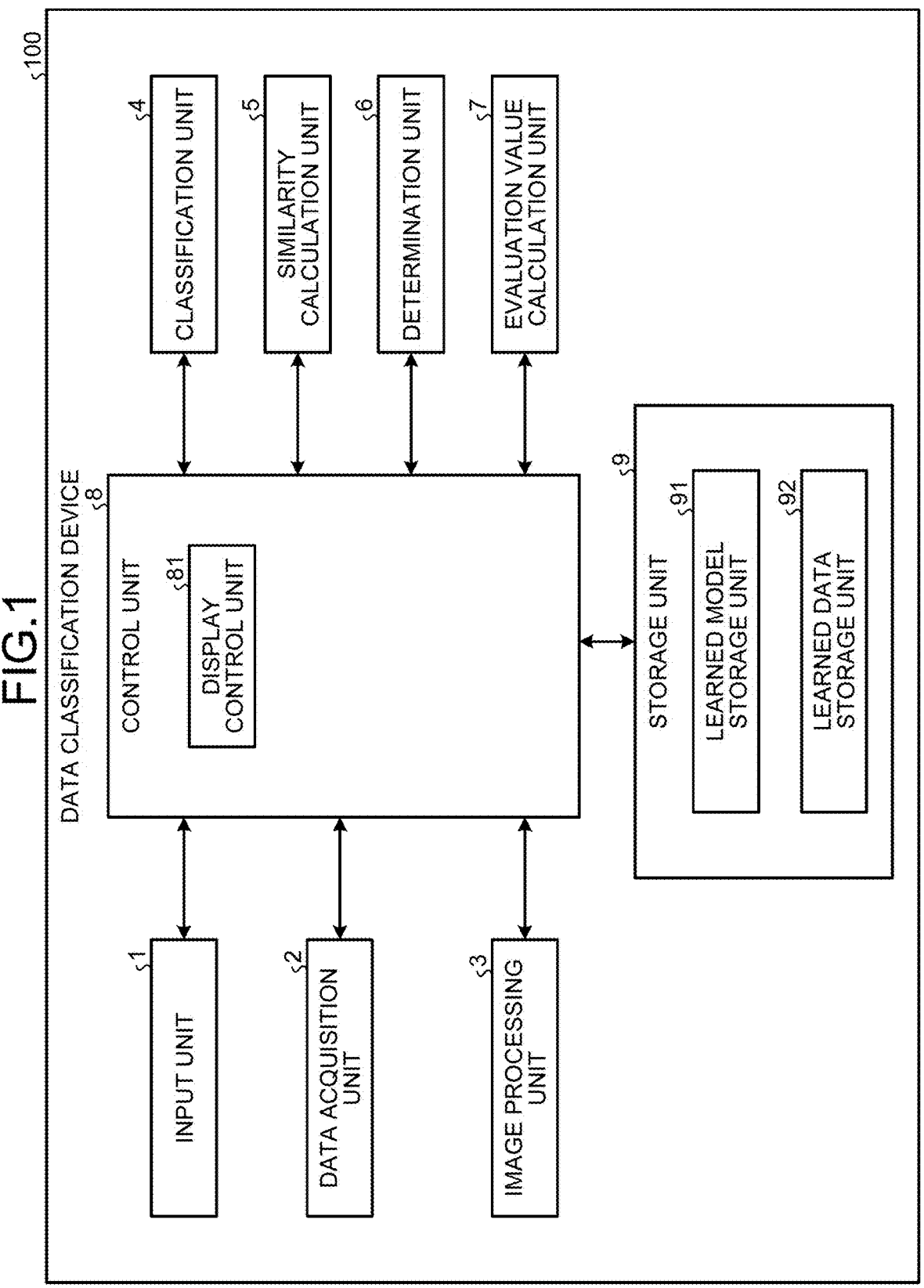
FIG. 1 is a block diagram illustrating a functional configuration of a data classification device according to an embodiment of the present invention.

FIG. 1 is a block diagram illustrating a functional configuration of a data classification device according to an embodiment of the present invention. A data classification device 100 illustrated in the figure is a device that classifies data of defect images acquired by imaging defects that occur in a manufacturing process of polymer-based films into one of a plurality of classes that differ according to the defect type. The defects to be classified include those caused by a raw material that has been melted during the film manufacturing process stagnating inside manufacturing equipment and being modified due to excessive temperature, heat, time, and the like, foreign matter mixed in during the manufacturing process, and scratches caused by the manufacturing equipment.

The functional structure of the data classification device 100 will be described below. The data classification device 100 includes an input unit 1, a data acquisition unit 2, an image processing unit 3, a classification unit 4, a similarity calculation unit 5, a determination unit 6, an evaluation value calculation unit 7, a control unit 8, and a storage unit 9.

The input unit 1 receives input of various types of information. The input unit 1 is configured by using a keyboard, mouse, microphone, or other user interface.

The data acquisition unit 2 acquires defect image data sent from a defect inspection machine that images the surface of the film, extracts defects, and generates defect image data including the defects, and outputs the data to the storage unit 9 for storage.

The image processing unit 3 performs known image processing on the defect image data, as well as image processing that uses portions other than the defects of the defect image data as a common background and that superimposes the defect portions on that background. The background is composed of a single color, for example, gray.

The classification unit 4 classifies the defect image data into one of the classes by inputting the defect image data processed by the image processing unit 3 to a learned model learned using a neural network. The learned model is a neural network made up of an input layer, a middle layer, and an output layer, each layer having one or more nodes. The learned model is generated by learning to optimize network parameters of the neural network. The network parameters include information about weights and biases between the layers of the neural network. Input parameters of the learned model are the defect image data, and output parameters are the probability of the data belonging to each class and a predetermined feature amount in the defect image data. This neural network is a convolutional neural network (CNN) that introduces a softmax loss function, preferably an $L_2$ softmax loss function with an $L_2$-norm constraint added to the softmax loss function (for the $L_2$ softmax loss function, see, for example, R. Ranjan et al., "$L_2$-constrained Softmax Loss for Discriminative Face Verification", preprint, arXiv:1703.09507 [cs. CV] (https://arxiv.org/pdf/1703.09507.pdf)). A feature amount is generally defined as a multidimensional vector made up of a plurality of components that give features of the image data.

The similarity calculation unit 5 calculates the similarity between the defect image data and learned defect image data used to generate the learned model (hereinafter also referred to as learned data). The similarity calculation unit 5 calculates the similarity by using the feature amount of the defect image data and the feature amount of the learned data. For the similarity, one of Euclidean distance, Mahalanobis distance, and Cosine similarity, for example, can be applied.

The determination unit 6 determines whether the defect image data belongs to one of the classes on the basis of the similarity, and if the data does not belong to any of the classes, the determination unit 6 determines that the data belongs to an unknown class. If the similarity meets a predetermined standard, the determination unit 6 determines the class to which the defect image data belongs according to the classification result of the classification unit 4. If the similarity does not meet the standard, the determination unit 6 determines that the defect image data is of an unknown class.

When the number of determinations by the determination unit 6 reaches a predetermined standard number of times, the evaluation value calculation unit 7 calculates the determination evaluation value, which is the ratio of determinations that the defect image data belongs to one of the classes, of the determinations made the standard number of times.

The control unit 8 oversees and controls the operation of the data classification device 100. The control unit 8 includes a display control unit 81 that causes a display device to display the determination result of the determination unit 6. The display control unit 81 outputs the defect image data most similar to the defect image data together with the determination result by the determination unit 6 to the display device for display. When the determination evaluation value is smaller than a threshold value, the control unit 8 outputs at least one of the evaluation result and information to prompt reconstruction of the learned model. The control unit 8 may output that information to the display device for display or to an audio output device for audio output.

Figure 2:
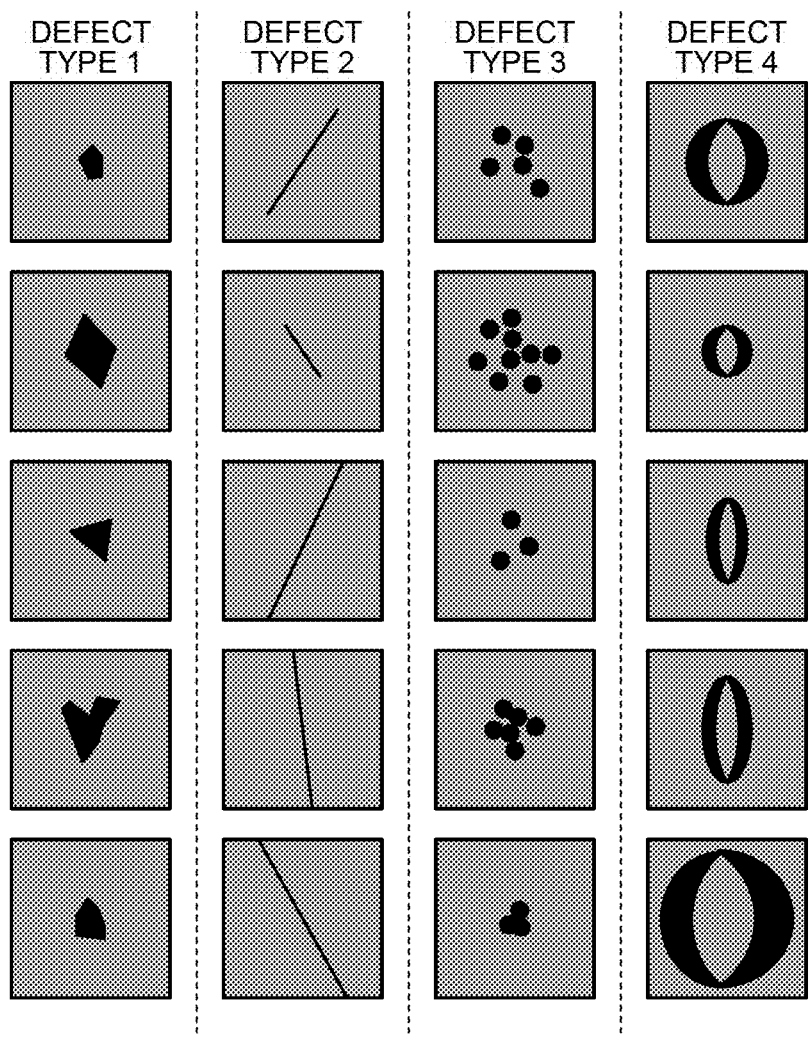
FIG. 2 is a diagram illustrating an example of defect image data stored by a learned data storage unit 92.

The storage unit 9 includes a learned model storage unit 91 and a learned data storage unit 92. The learned model storage unit 91 stores therein the learned model described above. The learned data storage unit 92 stores therein defect image data used to learn the learned model (hereinafter referred to as learned data), the feature amount of the learned data, and the class to which the data belongs. FIG. 2 is a diagram illustrating an example of learned data stored by the learned data storage unit 92. FIG. 2 illustrates a case where there are four classes of defect types (defect type 1 to defect type 4).

The storage unit 9 stores therein the number of determinations made by the determination unit 6. This number of determinations is reset under the control of the control unit 8 when the predetermined standard number of times is reached. The storage unit 9 also stores therein data including various computer programs for operating the data classification device 100 and various parameters necessary for the operation of the data classification device 100. The various computer programs include a data classification program according to the present embodiment. The storage unit 9 is configured by using a read only memory (ROM) in which various computer programs and the like are installed in advance, and a random access memory (RAM) that stores therein arithmetic parameters, data, and the like for each processing.

The various computer programs may be recorded on a computer-readable recording medium, such as a hard disk drive (HDD), a solid state drive (SSD), flash memory, CD-ROM, DVD-ROM, or Blu-ray (registered trademark), or may be made downloadable via a communication network. The communication network herein refers to one that is configured by using at least one of existing public network, local area network (LAN), and wide area network (WAN), for example, and can be either wired or wireless.

The data classification device 100 having the above functional configuration is a computer configured by using one or more pieces of hardware, such as a central processing unit (CPU), a graphics processing unit (GPU), an application specific integrated circuit (ASIC), and a field programmable gate array (FPGA).

Figure 3:
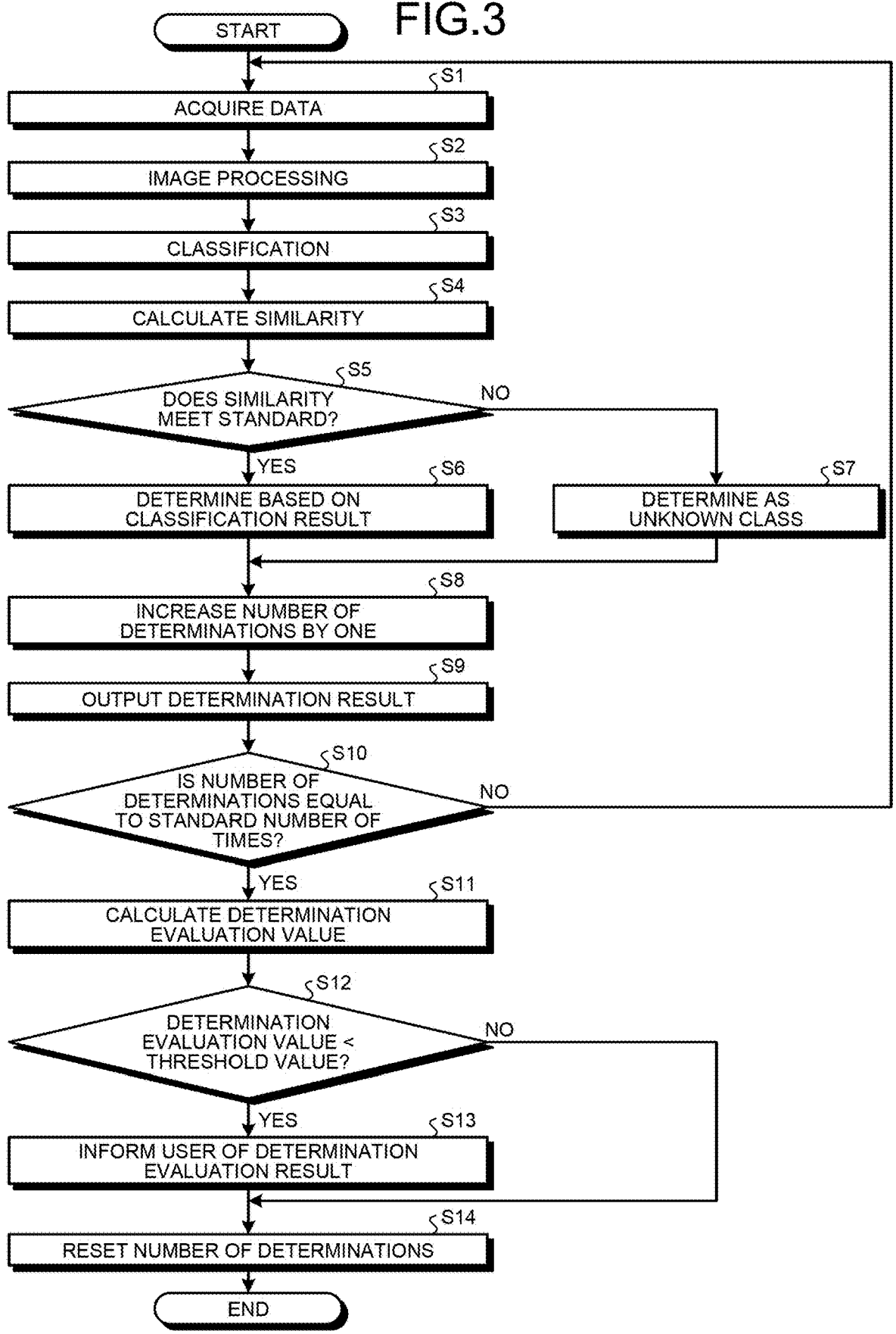
FIG. 3 is a flowchart illustrating an overview of processing performed by the data classification device according to the embodiment of the present invention.

FIG. 3 is a flowchart illustrating an overview of processing performed by the data classification device 100. First, the data acquisition unit 2 acquires defect image data from the defect inspection machine (step S1).

The image processing unit 3 then performs image processing (step S2). At this time, the image processing unit 3 performs rule-based image processing. The purpose here is to remove unnecessary areas in an image other than the defect section and to eliminate images in which it is obvious that no defects have been captured, for example. The classification processing from step S3 onward may use all images, or images to be classified may be selected in the image processing at step S2. Here, processing is performed to cut out a portion of specific size centered on the defect area and to make the background area other than the defect a single color background, such as gray, and the defect area is superimposed on this background.

Thereafter, the classification unit 4 performs classification using the learned model stored by the learned model storage unit 91 (step S3). Specifically, the classification unit 4 inputs the defect image data processed by the image processing unit 3 into the learned model, and acquires the probability of the data belonging to each class and the feature amount of the input defect image data as output parameters.

The similarity calculation unit 5 then calculates the similarity between the defect image data acquired at step S1 and the learned data by referring to the learned data storage unit 92 (step S4). For example, the similarity calculation unit 5 calculates the Euclidean distance between the feature amount of the defect image data and the feature amount of the learned data, and calculates the minimum Euclidean distance for each class as the similarity.

Thereafter, the determination unit 6 first determines whether the similarity meets the predetermined standard (step S5). If the similarity meets the standard at step S5 (Yes at step S5), the data classification device 100 moves to step S6. In a case where the minimum value of the Euclidean distance between the feature amount of the defect image data and the feature amount of the learned data in each class is taken as the similarity, the standard here is defined as the range of values that minimum value takes on, for example.

At step S6, the determination unit 6 makes a determination according to the classification result by the classification unit 4 (step S6). Specifically, the determination unit 6 determines that the class with the largest probability acquired at step S3 is the class to which the defect image data belongs.

If the similarity does not meet the standard at step S5 (No at step S5), the determination unit 6 determines that the defect image data is of an unknown class (step S7).

After step S6 or S7, the control unit 8 increases the number of determinations stored by the storage unit 9 by one (step S8).

The display control unit 81 then outputs the determination result to the display device for display (step S9). FIG. 4 and FIG. 5 are diagrams illustrating display examples of results determined by the determination unit 6 on the display device. Specifically, FIG. 4 illustrates a case where the defect image data is of a known class, and FIG. 5 illustrates a case where the defect image data is of an unknown class.

A screen 201 illustrated in FIG. 4 displays information indicating that the defect image data (image name "Sample1.png") has been classified into defect type 1, as well as four images and their respective Euclidean distances in ascending order of Euclidean distance. All the four images are of defect type 1.

A screen 202 illustrated in FIG. 5 displays information indicating that the defect image data (image name "Sample3.png") is of an unknown class, as well as four images in ascending order of Euclidean distance. These four images differ from each other in defect type.

According to these display examples, images that are similar to the image to be classified are displayed along with the determination result, which enables a user to visually understand the determination result by presenting not only the determination result but also the information on which the determination is based. Only at least one of the similar image and the Euclidean distance may be displayed. The number of images to be displayed is not limited to four, and may be set freely as long as there is more than one.

After step S9, the evaluation value calculation unit 7 compares the number of determinations by the determination unit 6 with the predetermined standard number of times by referring to the storage unit 9 (step S10). If the number of determinations by the determination unit 6 is less than the standard number of times (No at step S10), the process is repeated by returning to the data acquisition processing at step S1. If the number of determinations by the determination unit 6 reaches the standard number of times (Yes at step S10), the evaluation value calculation unit 7 calculates the determination evaluation value, which is the ratio of determinations that the defect image data belongs to one of the classes, of the determinations made the standard number of times (step S11).

If the calculated determination evaluation value is smaller than the predetermined threshold value (Yes at step S12), the display control unit 81 outputs information on the determination evaluation result to the display device for display, thereby informing the user of the determination evaluation result (step S13). The display control unit 81 may cause the display device to display information that prompts reconstruction of the learned model, instead of the determination evaluation result, or may cause the display device to display the determination evaluation result and information that prompts reconstruction of the learned model. This operation allows the user to recognize that the accuracy of the learned model is not adequate.

The control unit 8 then resets the number of determinations stored by the storage unit 9 to zero (step S14). Thereafter, the data classification device 100 ends a series of processing.

At step S12, if the calculated determination evaluation value is equal to or higher than the predetermined threshold value (No at step S12), the data classification device 100 moves to step S14, resets the number of determinations, and ends the series of processing.

Figure 6:
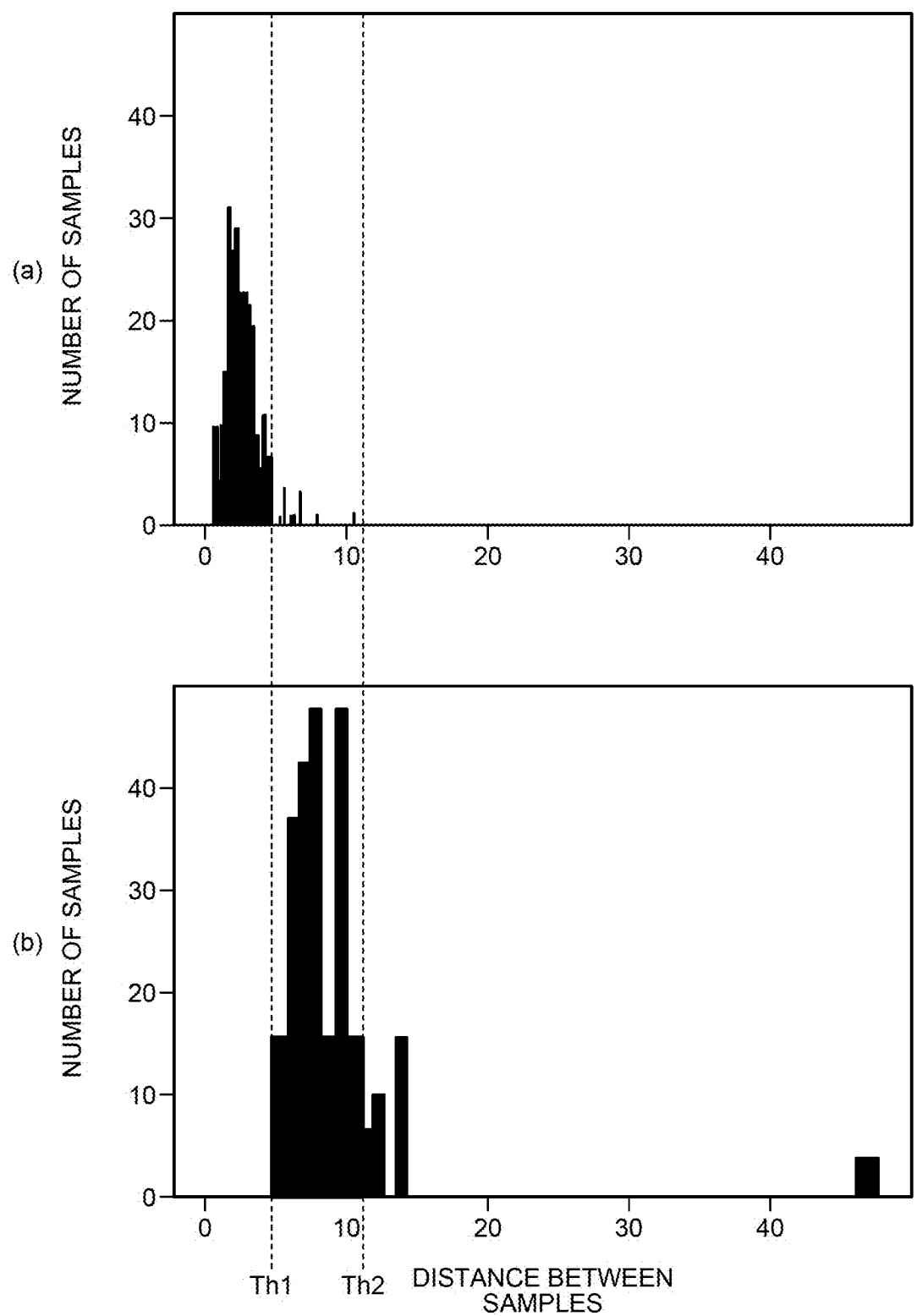
FIG. 6 is a diagram illustrating an effect of the embodiment of the present invention.

FIG. 6 illustrates an effect of the embodiment described above. Specifically, FIG. 6 illustrates histograms of (a) a result of the minimum Euclidean distance calculated between samples of known classes and the learned data in each class, and (b) a result of calculating the minimum Euclidean distance calculated between samples of unknown classes and the learned data in each class. Here, the histograms are created assuming that the class to which a sample belongs has already been determined in advance. In FIG. 6, cases are illustrated where two different threshold values, Th1 and Th2, are set as threshold values that provide boundaries for discriminating between known and unknown classes.

First, the case will be described where the threshold value is set at Th1, that is, where the samples having values of equal to or smaller than the threshold value Th1 are defined as known classes. In this case, according to (a), some of the samples of the known class are included in the unknown class, while according to (b), the samples of the unknown class are not included in the known class.

Next, the case will be described where the threshold value is set at Th2, that is, where the samples having values of equal to or smaller than the threshold value Th2 are defined as known classes. In this case, according to (a), all of the samples of the known class fall into the range of values equal to or smaller than the threshold value, while according to (b), many of the samples of the unknown class are included in the known class.

Figure 7:
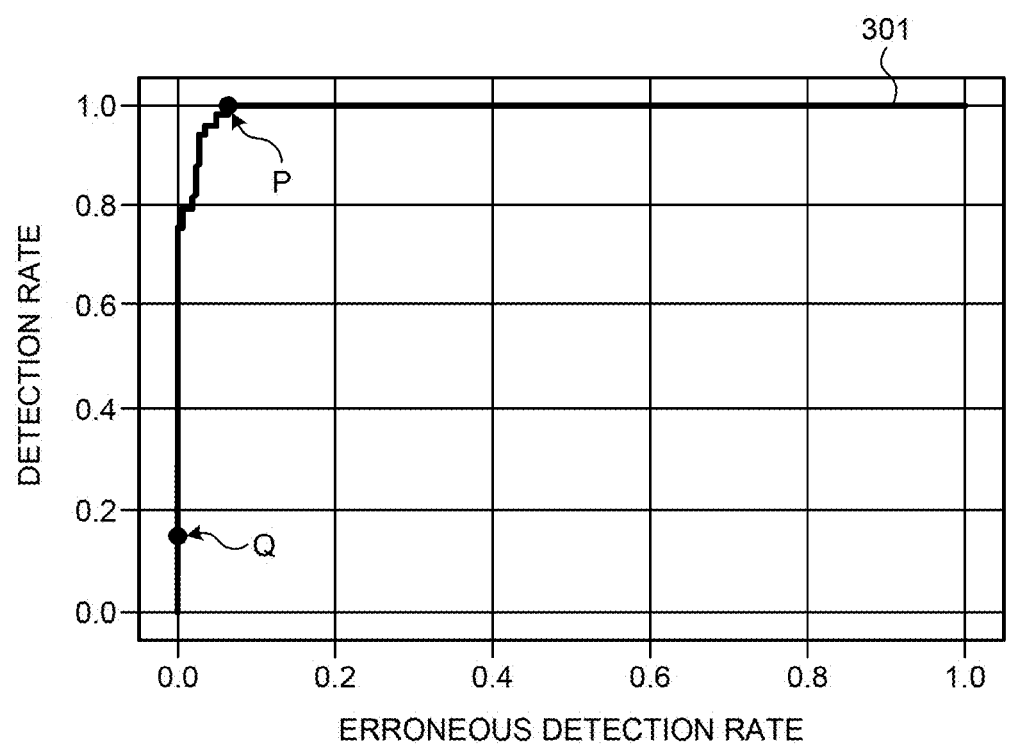
FIG. 7 is a diagram illustrating changes in the detection rate of unknown classes and the erroneous detection rate of known classes when threshold values for discriminating between known and unknown classes have been changed in the example illustrated in FIG. 6.

FIG. 7 is a diagram illustrating changes in the detection rate of unknown classes and the erroneous detection rate of known classes when the threshold values have been changed in the example illustrated in FIG. 6. A curve 301 illustrated in FIG. 7 is a receiver operating characteristic (ROC) curve, where points P and Q on the curve respectively correspond to the threshold values Th1 and Th2. For the threshold value Th1, the detection rate is 100% while the erroneous detection rate is less than 10%. In contrast, for the threshold value Th2, the detection rate is about 15% while the erroneous detection rate is 08. The area under the ROC curve (AUC), which is the area between this curve 301 and the axis of abscissa, was found to be 0.9899 and quite close to the fully separable case (AUC=1.00). In other words, it became clear that the present embodiment enables separation of known and unknown classes with high accuracy.

Figure 8:
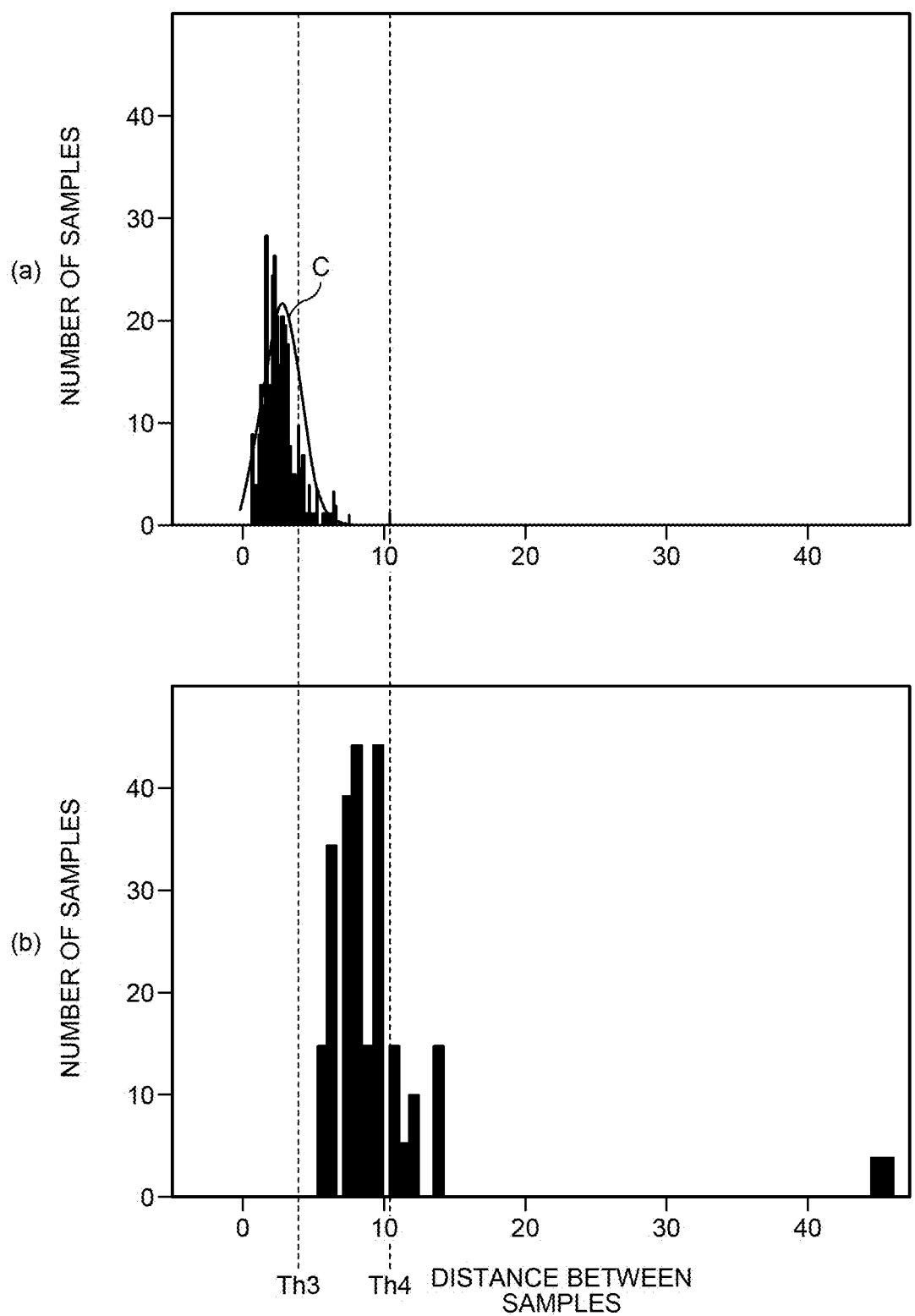
FIG. 8 is a diagram illustrating another way to determine a threshold value that provides the boundary for discriminating between known and unknown classes in the embodiment of the present invention.

FIG. 8 is a diagram illustrating another way to determine a threshold value that provides the boundary for discriminating between known and unknown classes in the embodiment described above. The diagram of (a) in FIG. 8 illustrates a histogram illustrating the result of the minimum Euclidean distance calculated between the samples of known classes and the learned data in each class, and its normal distribution curve C. This normal distribution curve C is a line drawn assuming that the histogram is normally distributed. The diagram of (b) in FIG. 8 illustrates a histogram illustrating the result of the minimum Euclidean distance calculated between the samples of unknown classes and the learned data in each class. In FIG. 8, the histograms are created assuming that the class to which a sample belongs has already been determined in advance, in the same way as in FIG. 6. In FIG. 8, cases are illustrated where a threshold value Th3 or Th4, is set as a threshold value that provides a boundary for discriminating between known and unknown classes.

In setting a threshold value that provides a boundary for discriminating between known and unknown classes, it may be difficult to prepare samples of unknown classes in advance. In such a case, the threshold value would be set from the minimum Euclidean distance between samples of known classes and learned data in each class.

First, a normal distribution is assumed for the histograms illustrating the result of the minimum Euclidean distance calculated between the samples of known classes and the learned data in each class. Next, a threshold value is determined from the confidence interval calculated from the mean $\mu$ and the standard deviation $\sigma$ of the normal distribution. The distribution to be determined is not limited to a normal distribution, and a half-normal distribution or Poisson distribution may be used, or a mixture distribution that takes multimodality into account may be assumed as a probability distribution.

Here, a case will be described where the threshold value is set at Th3 (66% confidence interval of the normal distribution: mean $\mu+1\sigma$), that is, where the samples having values of equal to or smaller than the threshold value Th3 are defined as known classes. In this case, as illustrated in (a) of FIG. 8, some of the samples of the known class are included in the unknown class, while, as illustrated in (b), some of the samples of the unknown class are not included in the known class.

In addition, a case will be described where the threshold value is set at Th4 (99.9997 confidence interval of the normal distribution: mean $\mu+6\sigma$), that is, where the samples having values of equal to or smaller than the threshold value Th4 are defined as known classes. In this case, as illustrated in (a) of FIG. 8, all of the samples of the known class fall into the range of values equal to or smaller than the threshold value, while as illustrated in (b) of FIG. 8, many of the samples of the unknown class are included in the known class.

From the above, if it is difficult to prepare samples of unknown classes in advance, threshold values according to the operational use may be set from samples of known classes only. For example, to avoid mistakenly determining a sample of a known class as a sample of an unknown class, a threshold value may be set like Th4. Conversely, to avoid mistakenly determining a sample of an unknown class as a sample of a known class, a threshold value may be set like Th3. Setting threshold values is not limited to the above, and threshold values are preferably set according to operational objectives.

According to the embodiment of the present invention described above, the similarity between the acquired defect image data and the learned data used to generate the learned model is calculated, whether the defect image data belongs to the classes is determined on the basis of the calculated similarity, and, if the data does not belong to any of the classes, the data is determined to belong to an unknown class, so that data of an unknown class can be prevented from being classified into a known class.

According to the present embodiment, at least defect image data most similar to the defect image data is displayed on the display device along with the determination result, so that the user can visually grasp the basis for the determination in addition to whether the defect image data belongs to a known class or an unknown class.

According to the present embodiment, when the number of determinations reaches the standard number of times, the determination evaluation value, which is the ratio of determinations that the defect image data belongs to one of the classes, of the determinations made the standard number of times, is calculated, and when the calculated result is smaller than the threshold value, an evaluation result or information to prompt reconstruction of the learned model is output. Thus, when the learned model in use is not valid, this fact can be informed promptly. In this regard, in the conventional film manufacturing process, if an optical system of the defect inspection machine is changed or manufacturing conditions of a product are changed, the previously used learned model may no longer be able to properly classify the product. Additionally, it has been difficult to evaluate the classification itself during operation. In contrast, in the present embodiment, because the classification itself is evaluated at predetermined intervals, the user can be informed accurately that the learned model is nonconforming when any changes occur in the manufacturing process. In addition, although preprocessing is performed on the image at step S2, in view of the possibility of errors here, it is also possible to classify an image without image processing at step S2 prepared in advance, or to perform another image processing method under different conditions with different threshold values, filters, and the like prepared in advance, and then try classification again from step S3 onward.

Although the embodiment of the present invention has been described so far, the present invention should not be limited only by the one embodiment described above. For example, the similarity calculation unit 5 may calculate the similarity between the feature amount of the defect image data and the feature amount of data of a representative image of each class. The representative image may be an image with the feature amount closest to the center of gravity in the feature space of feature amount of each class, or an image with the feature amount closest to the average of the feature amount of each class.

In addition to defect determination during film manufacture, the present invention can also be applied to detection of abnormalities in time-series data (irregular pulse detection in human heartbeat data, for example).

INDUSTRIAL APPLICABILITY

The data classification device, the data classification method, and the data classification program of the present invention are preferably applicable to prevent classification of data of an unknown class into a known class, but the scope of application is not limited thereto.

REFERENCE SIGNS LIST

1 Input unit
2 Data acquisition unit
3 Image processing unit
4 Classification unit
5 Similarity determination unit
6 Determination unit
7 Evaluation value calculation unit
8 Control unit
9 Storage unit
81 Display control unit
91 Learned model storage unit
92 Learned data storage unit
100 Data classification device
201, 202 Screens
301 Curve

The invention claimed is:

1. A data classification device for a manufacturing process comprising:
at least one memory storing computer program instructions; and
at least one processor coupled to the memory, the at least one processor configured to:
acquire defect image data of product defects captured during the manufacturing process to be classified;
classify the defect image data into one of a plurality of classes by inputting the defect image data into a learned model learned using a neural network, wherein the learned model outputs classification probabilities and feature amount of the inputted defect image data;
calculate similarity to each classes between the inputted defect image data and learned defect image data used to generate the learned model, wherein the similarity to each classes is a minimum value in each class of Euclidean distance between a feature amount of the inputted defect image data and a feature amount of the learned defect image data in a feature space, or the similarity to each classes is a predetermined distance between a feature amount of the inputted defect image data and the learned defect image data representing each of the classes in a feature space;
determine, when the similarity meets a standard, a class to which the inputted defect image data belongs according to the classification probabilities, and determine that, when the similarity does not meet the standard, the inputted defect image data is of an unknown class; and
display, together with the class to which the inputted defect image data belongs, at least the learned defect image data most similar to the inputted defect image data on a display device.

2. The data classification device according to claim 1, wherein, the at least one processor is configured to:
calculate, when the number of determinations reaches the standard number of times, a determination evaluation value, which is a ratio of determinations that the inputted defect image data belongs to one of the classes, of determinations made the standard number of times; and
output, when the determination evaluation value is smaller than a threshold value, at least one of the class to which the inputted defect image data belongs and information that prompts reconstruction of the learned model.

3. A method for data classification of a manufacturing process, the method comprising:
acquiring defect image data of product defects captured during the manufacturing process to be classified;
classifying the defect image data into one of a plurality of classes by inputting the defect image data into a learned model learned using a neural network, wherein the learned model outputs classification probabilities and feature amount of the inputted defect image data;

calculating similarity to each classes between the inputted defect image data and learned defect image data used to generate the learned model, wherein the similarity to each classes is a minimum value in each class of Euclidean distance between a feature amount of the inputted defect image data and a feature amount of the learned defect image data in a feature space, or the similarity to each classes is a predetermined distance between a feature amount of the inputted defect image data and the learned defect image data representing each of the classes in a feature space;

determining, when the similarity meets a standard, a class to which the inputted defect image data belongs according to the classification probabilities, and determining that, when the similarity does not meet the standard, the inputted defect image data is of an unknown class; and displaying, together with the class to which the inputted defect image data belongs, at least the learned defect image data most similar to the inputted defect image data on a display device.

4. A non-transitory computer-readable recording medium with an executable program for a manufacturing process stored thereon, the program causing a computer to execute:

acquiring defect image data of product defects captured during the manufacturing process to be classified;

classifying the defect image data into one of a plurality of classes by inputting the defect image data into a learned model learned using a neural network, wherein the learned model outputs classification probabilities and feature amount of the inputted defect image data;

calculating similarity to each classes between the inputted defect image data and learned defect image data used to generate the learned model, wherein the similarity to each classes is a minimum value in each class of Euclidean distance between a feature amount of the inputted defect image data and a feature amount of the learned defect image data in a feature space, or the similarity to each classes is a predetermined distance between a feature amount of the inputted defect image data and the learned defect image data representing each of the classes in a feature space;

determining, when the similarity meets a standard, a class to which the inputted defect image data belongs according to the classification probabilities, and determining that, when the similarity does not meet the standard, the inputted defect image data is of an unknown class; and displaying, together with the class to which the inputted defect image data belongs, at least the learned defect image data most similar to the inputted defect image data on a display device.

\* \* \* \* \*